(12) United States Patent
Kuvvetli et al.

(10) Patent No.: US 10,935,675 B2
(45) Date of Patent: Mar. 2, 2021

(54) RADIATION DETECTOR

(71) Applicant: Danmarks Tekniske Universitet, Kgs. Lyngby (DK)

(72) Inventors: Irfan Kuvvetli, København K (DK); Carl Budtz-Jørgensen, Allerød (DK)

(73) Assignee: Danmarks Tekniske Universitet

( * ) Notice: Subject to any disclaimer, the term of this patent is extended or adjusted under 35 U.S.C. 154(b) by 142 days.

(21) Appl. No.: 16/340,016

(22) PCT Filed: Oct. 9, 2017

(86) PCT No.: PCT/DK2017/050333
§ 371 (c)(1),
(2) Date: Apr. 5, 2019

(87) PCT Pub. No.: WO2018/065024
PCT Pub. Date: Apr. 12, 2018

(65) Prior Publication Data
US 2020/0033489 A1    Jan. 30, 2020

(30) Foreign Application Priority Data

Oct. 7, 2016  (EP) .................................. 16192885

(51) Int. Cl.
*G01T 1/24*  (2006.01)
*G01T 1/161*  (2006.01)
(52) U.S. Cl.
CPC .............. *G01T 1/247* (2013.01); *G01T 1/161* (2013.01); *G01T 1/241* (2013.01)

(58) Field of Classification Search
CPC .......... G01T 1/161; G01T 1/241; G01T 1/247
See application file for complete search history.

(56) References Cited

U.S. PATENT DOCUMENTS

| | | | |
|---|---|---|---|
| 6,169,287 | B1 | 1/2001 | Warburton |
| 2005/0139775 | A1 | 6/2005 | Gono et al. |
| 2009/0045345 | A1 | 2/2009 | Gros D'Aillon et al. |

(Continued)

FOREIGN PATENT DOCUMENTS

| | | |
|---|---|---|
| EP | 2 060 932 A1 | 5/2009 |
| JP | 2005208057 A | 8/2005 |
| WO | WO 2015078902 A1 | 6/2015 |

*Primary Examiner* — Mark R Gaworecki
(74) *Attorney, Agent, or Firm* — Condo Roccia Koptiw LLP

(57) ABSTRACT

Disclosed is a semiconductor radiation detector for detecting X-ray and/or gamma-ray radiation. The radiation detector comprises: a converter element for converting incident X-ray and gamma-ray photons into electron-hole pairs; a plurality of first cathode electrodes extending along a first axis and being arranged on a first side of the converter element with a pitch (P) along a second axis perpendicular to the first axis; at least one anode electrode arranged on a second side of the converter element; a readout circuitry; and a processing unit connected to the readout circuitry. The Processing unit being configured to determine for each of the plurality of first cathode electrodes the electrical potential at a first and second point in time (t1) (t2) resulting in a plurality of determined potentials; and estimate the location of the event in the converter element along the second axis by processing the plurality of determined potentials.

20 Claims, 4 Drawing Sheets

(56) References Cited

U.S. PATENT DOCUMENTS

| | | | |
|---|---|---|---|
| 2013/0161523 A1* | 6/2013 | Tkaczyk | H01L 31/085 250/370.13 |
| 2014/0319363 A1* | 10/2014 | Engel | G01T 1/24 250/370.01 |
| 2017/0168168 A1* | 6/2017 | Kuvvetli | G01T 1/161 |

* cited by examiner

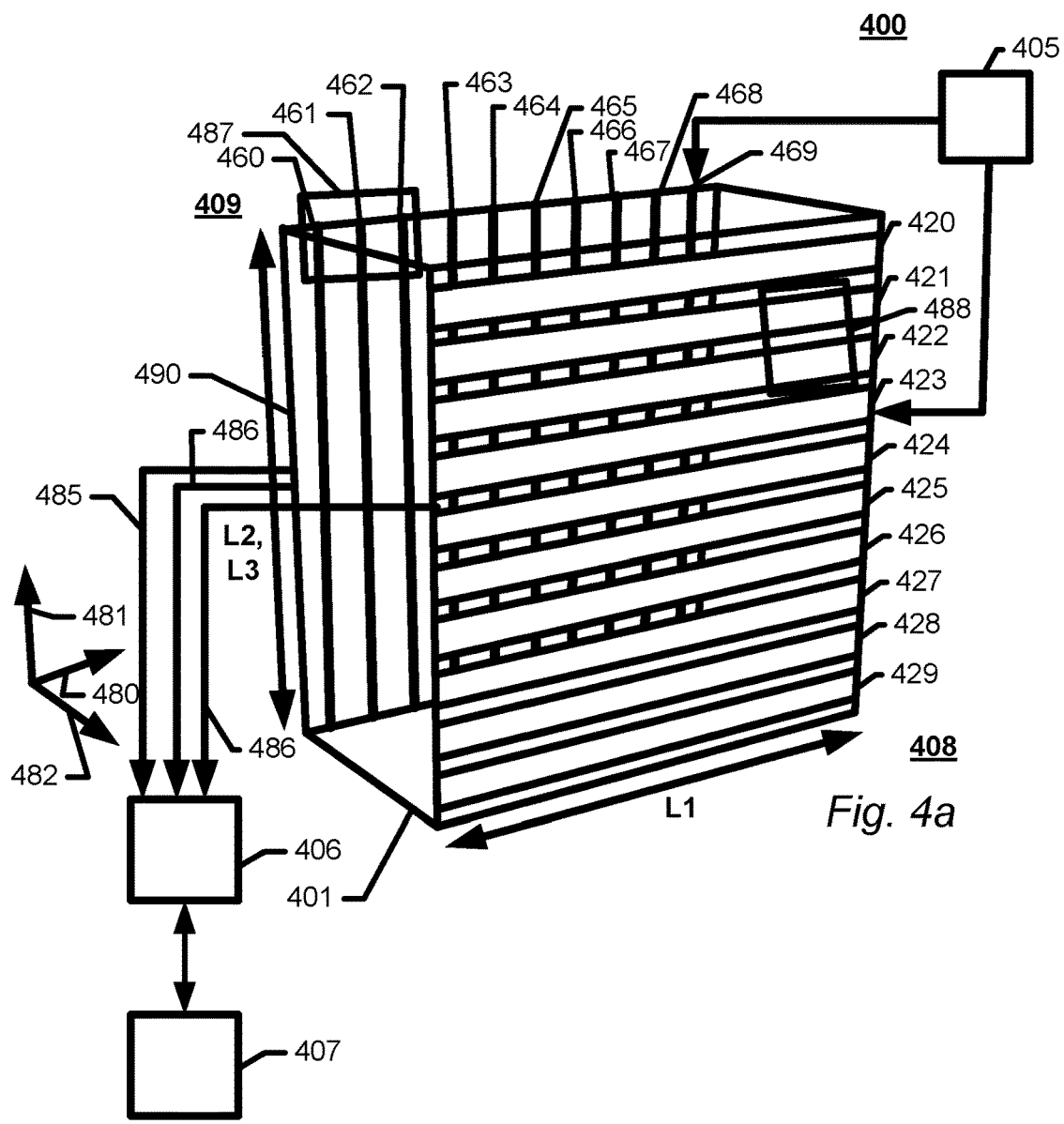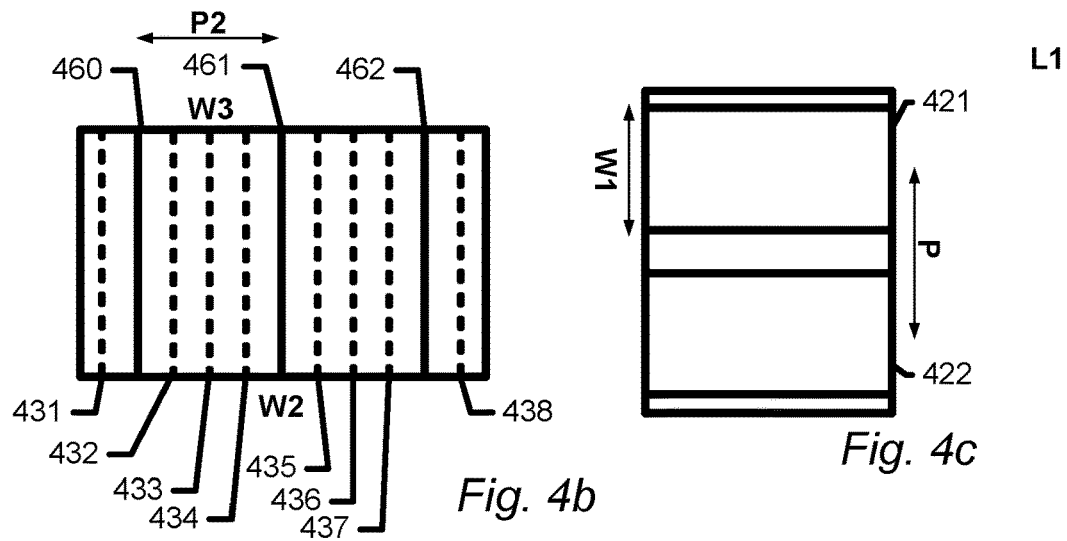

RADIATION DETECTOR

CROSS REFERENCE TO RELATED APPLICATIONS

This application is the National Stage Entry under 35 U.S.C. § 371 of Patent Cooperation Treaty Application No. PCT/DK2017/050333, filed Oct. 9, 2017, which claims priority from European Application No. 16192885.8, filed Oct. 7, 2016, the contents of which are hereby incorporated by reference in their entireties.

FIELD

The present invention relates to a semiconductor radiation detector for detecting X-ray and/or gamma-ray radiation. The invention further relates to a method for estimating a location of an interaction between an X-ray or gamma-ray photon and a converter element.

BACKGROUND

Detection of X-rays and gamma-rays has a large number of important applications such as national security, medical imaging, astrophysics, and gamma-ray spectroscopy.

Conventional detectors based on Ge and Si have the disadvantage that they require the converter element to be cryogenically cooled. This makes the detectors very complex and expensive.

A special development has been the use of so-called room temperature detectors based on novel heavy compound semiconductors, e.g. Cadmium Zinc Telluride (CZT), which do not require cryogenic cooling.

WO2015078902 discloses a semiconductor radiation detector for detecting X-ray and/or gamma-ray radiation. The detector uses signals from drift strip electrodes to improve the resolution along an axis being parallel to the anode electrodes.

US2005139775 discloses a gamma-ray image pickup apparatus. A Compton camera is constructed by arranging two electrode split planar germanium semiconductor detectors in front and behind.

It is, however, a problem with the above detectors that they may have a limited resolution along an axis running perpendicular to the cathode electrodes for particular events and that they may have a limited robustness to noise. Furthermore, the technique may be unsuitable for use with room temperature detectors.

Thus it remains a problem to provide a semiconductor radiation detector having a high resolution along an axis running perpendicular to the cathode electrodes for all events and that is more robust to noise.

SUMMARY

According to a first aspect, the invention relates to a semiconductor radiation detector for detecting X-ray and/or gamma-ray radiation comprising:
a converter element for converting incident X-ray and gamma-ray photons into electron-hole pairs, said converter element comprising a first side and a second side, said second side being opposite to said first side;
a plurality of first cathode electrodes extending along a first axis and being arranged on said first side of said converter element with a pitch (P) along a second axis, the second axis being perpendicular to the first axis;
at least one anode electrode arranged on said second side of said converter element;
a readout circuitry being configured to read out signals from said plurality of first cathode electrodes;
a processing unit connected to said readout circuitry, said processing unit being configured to estimate the location of an event in said converter element along said second axis by processing signals from said plurality of first cathode electrodes;
wherein said processing unit is further configured to:
determine for each of said plurality of first cathode electrodes, including the cathode electrode being closest to the event, the electrical potential at a first point in time (t1) and the electrical potential at a second point in time (t2) resulting in a plurality of determined potentials; and
estimate the location of said event in said converter element along said second axis by processing said plurality of determined potentials.

Consequently, by determining two electrical potentials for each cathode electrode the transient information in the cathode signals may be utilized to improve the resolution. This has shown especially useful for events located close to the cathode electrodes. Furthermore, by using information from all cathode electrodes a radiation detector being more robust to noise is provided.

The detector may be configured to detect X-rays or gamma-rays having energies between 10 keV and 3000 keV, or between 20 keV and 2000 keV. The converter element may be a heavy compound semiconductor such as Cadmium Zinc Telluride (CZT), CdMnTe, HgI, TIBr, HgCdTe, PbI, InP, and GaAs.

The converter element may have a height between 1 mm and 20 mm, 2 mm and 8 mm or 2.5 mm and 7.5 mm. The height of the converter element is defined as the distance between the first side and the second side of the converter element. The plurality of first cathode electrodes are negatively biased relative to the at least one anode plurality of detector electrodes.

The pitch (P) may be between 0.25 mm and 20 mm, between 0.5 mm and 10 mm, or between 1 mm and 4 mm.

An event is defined as the interaction between an X-ray or gamma-ray photon and the converter element creating an electron/hole pair.

The first point in time (t1) is preferably the same point in time for all cathode electrodes. Correspondingly, the second point in time (t2) is preferably the same point in time for all cathode electrodes. However, the first point in time (t1) and the second point in time (t2) may be different for the different cathode electrodes. The first point in time and the second point may be pre selected and found by a calibration procedure e.g. a controlled beam of radiation having a known position may be used to select suitable values for t1 and t2. The potential determined at the first point (t1) in time may be determined with respect to the resting potential i.e. for each of said plurality of first cathode electrodes, including the cathode electrode being closest to the event, the electrical potential at the first point in time (t1) may be determined with respect to their respective resting potential. Correspondingly, the potential determined at the second point in time (t2) may be determined with respect to the resting potential i.e. for each of said plurality of first cathode electrodes, including the cathode electrode being closest to the event, the electrical potential at the second point in time (t2) may be determined with respect to their respective resting potential.

The processing unit may be configured to determine the potential for each of the plurality of first electrodes more than twice e.g. at least 3, 4, 5, or 10 times. The processing unit may be configured to estimate the location of the event by processing all of the determined potentials.

The processing unit may be configured to: continuously monitor the electrical potential of each of said plurality of first cathode electrodes for changes, and once a change has been detected (indicative of an event) wait a first predetermined period of time until (t1) is reached, determine for each of said plurality of first cathode electrodes, including the cathode electrode being closest to the event, the electrical potential at the first point in time (t1), wait a second predetermined period of time until (t2) is reached, and determine for each of said plurality of first cathode electrodes, including the cathode electrode being closest to the event, the electrical potential at the second point in time (t2).

In some embodiments, said plurality of first cathode electrodes is a group of cathode electrodes selected from all the cathode electrodes arranged on said first side of said converter element, and wherein said group of cathode electrodes is selected independent of the location of the event.

Traditional radiation detectors determine a rough estimate of the location of an event in a first step by finding the cathode electrode being closest to the event. Subsequently in a second step, a more precise estimate of the location of an event with a sub pitch resolution is found by further utilizing information obtained from the cathode electrodes neighbouring the cathode electrode found in the first step.

By estimating the location of the event with a sub pitch resolution along said second axis in a single step a simpler, more precise and noise robust radiation detector is provided.

The group of cathode electrodes may preferably consist of all the cathode electrodes arranged on the first side of the converter element. In some embodiments, said plurality of first cathode electrodes are elongated parallel cathode strip electrodes having a width (W1), and a length (L1) extending along the first axis, the pitch (P) being the pitch between two neighbouring strips.

In some embodiments, said processing unit is further configured to determine for each of said plurality of first cathode electrodes the difference between the electrical potential at the first point in time (t1) and the electrical potential at the second point in time (t2) resulting in a plurality of temporal potential differences and estimating the position of the event along the second axis by processing the plurality of temporal potential differences.

Consequently, a simple and effective way of utilizing the transient information in the cathode signals is provided.

In some embodiments, said processing unit is configured to estimate the position of said event along said second axis using the equation:

$$Pos = \left( \sum_{i=1}^{N} I_i (Q_i(t_2) - Q_i(t_1)) \right) \cdot \frac{1}{\sum_{j=1}^{N} (Q_j(t_2) - Q_j(t_1))}$$

where Pos is the position along said second axis of the event, N is the total number of first cathode electrodes, $I_i$ is the position of the i'th first cathode electrode along said second axis, $Q_i(t_1)$ is the determined potential of the i'th first cathode electrode at the first point in time (t1), $Q_i(t_2)$ is the determined potential of the i'th first cathode electrode at the second point in time (t2), $Q_j(t_1)$ is the determined potential of the j'th first cathode electrode at the first point in time (t1), and $Q_j(t_2)$ is the determined potential of the j'th first cathode electrode at the second point in time (t2).

In some embodiments, said converter element is a room temperature converter element such as a Cadmium Zinc Telluride (CZT) converter element.

In some embodiments, a plurality of elongated parallel anode strip electrodes are arranged on said second side of said converter element with a pitch (P2), said plurality of anode strip electrodes having a width (W2), and a length (L2) and extending along the second axis; the pitch (P2) being the pitch between two neighbouring strips;

the readout circuitry being further configured to read out signals from said plurality of elongated parallel anode strip electrodes; and the processing unit being further configured to estimate the location of the event along said first axis by processing signals obtained from said plurality of elongated parallel anode strip electrodes.

Consequently, the radiation detector may estimate the location of the event in 2 dimensions.

The second said of the converter element may further be provided with drift strip electrodes arranged between the elongated parallel anode strip electrodes, where the drift strip electrodes are provided with a negative potential relative to the potential of the anode strip electrodes. The readout circuitry may further be configured to readout signals from the drift strip electrodes and the processing unit may be configured to estimate the location of the event along the first axis by processing signals readout from both the drift strip electrodes and the anode strip electrodes e.g. as disclosed in WO2015078902.

In some embodiments, said processing unit is further configured to estimate the depth of said event, by processing one or more signals obtained from said anode strip electrodes together with one or more signals obtained from said cathode strip electrodes.

Consequently, an estimate of the location of the event in two or even three dimensions may be provided.

The depth information (also called depth sensing) can be derived from the ratio R≡Qp/Qs, where Qp is the cathode signal and Qs the detector strip signal. A more detailed discussion may be found in "Kuvvetli, I.; Budtz-Jørgensen, C.,: "Charge Collection and Depth Sensing Investigation on CZT Drift Strip Detectors", IEEE Nuclear Science Symposium Conference Record NSS (R7-2), 2010".

According to a second aspect the invention relates to a method for estimating a location of an interaction between an X-ray or gamma-ray photon and a converter element, said converter element converting incident X-ray and gamma-ray photons into electron-hole pairs, said converter element comprising a first side and a second side, said second side being opposite to said first side, the method comprising the steps of:

receiving in a processing unit signals from a plurality of first cathode electrodes extending along a first axis and being arranged on said first side of said converter element with a pitch (P) along a second axis, the second axis being perpendicular to said first axis;

determining using said processing unit, for each of said plurality of first cathode electrodes, including the cathode electrode being closest to an event, the electrical potential at a first point in time (t1) and the electrical potential at a second point in time (t2) resulting in a plurality of determined potentials; and estimating using said processing unit, the location of said event in said converter element along said second axis by processing said plurality of determined potentials.

At least one anode electrode is preferably arranged on said second side of said converter element.

In some embodiments, said plurality of first cathode electrodes is a group of cathode electrodes selected from all the cathode electrodes arranged on said first side of said converter element, and wherein said group of cathode electrodes is selected independent of the location of the event.

In some embodiments, said plurality of first cathode electrodes are elongated parallel cathode strip electrodes having a width (W1), and a length (L1) extending along the first axis, the pitch (P) being the pitch between two neighbouring strips.

In some embodiments the method further comprises the steps of:

determining using said processing unit, for each of said plurality of first cathode electrodes the difference between the electrical potential at the first point in time (t1) and the electrical potential at the second point in time (t2) resulting in a plurality of temporal potential differences; and wherein the positioning of the event along the second axis is estimated by processing the plurality of temporal potential differences.

In some embodiments, said processing unit is configured to estimate the position of said event along said second axis using the equation:

$$Pos = \left(\sum_{i=1}^{N} I_i(Q_i(t_2) - Q_i(t_1))\right) \cdot \frac{1}{\sum_{j=1}^{N}(Q_j(t_2) - Q_j(t_1))}$$

where Pos is the position along said second axis of the event, N is the total number of first cathode electrodes, $I_i$ is the position of the i'th first cathode electrode along said second axis, $Q_i(t_1)$ is the determined potential of the i'th first cathode electrode at the first point in time (t1), $Q_i(t_2)$ is the determined potential of the i'th first cathode electrode at the second point in time (t2), $Q_j(t_1)$ is the determined potential of the j'th first cathode electrode at the first point in time (t1), and $Q_j(t_2)$ is the determined potential of the j'th first cathode electrode at the second point in time (t2).

In some embodiments, said converter element is a room temperature converter element such as a Cadmium Zinc Telluride (CZT) converter element.

In some embodiments, the method further comprises the steps of:

receiving in said processing unit, signals from a plurality of elongated parallel anode strip electrodes arranged on said second said of said converter element with a pitch (P2), said plurality of anode strip electrodes having a width (W2), and a length (L2) and extending along the second axis; the pitch (P2) being the pitch between two neighbouring strips;

estimating using said processing unit, the location of the event along said first axis by processing signals obtained from said plurality of elongated parallel anode strip electrodes.

In some embodiments, the method further comprises the step of:

estimating using said processing unit, the depth of said event, by processing one or more signals obtained from said detector strip electrodes together with one or more signals obtained from said cathode electrodes.

According to a third aspect the invention relates to use of a radiation detector as disclose in relation to the first aspect of the invention in:

a medical imaging device such as a CT scanner, a PET scanner, a PET-CT scanner, or a SPECT scanner;

a satellite; or a security system for detecting and localizing radioactive material.

Here and in the following, the term 'processing unit' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc. or a combination thereof The different aspects of the present invention can be implemented in different ways including as a radiation detector and as a method for estimating a location of an interaction between an X-ray or gamma-ray photon and a converter element as described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 4 shows a schematic drawing of a 3D semiconductor radiation detector according to an embodiment of the invention.

DETAILED DESCRIPTION

In the following description, reference is made to the accompanying figures, which show by way of illustration how the invention may be practiced.

Figure 1:
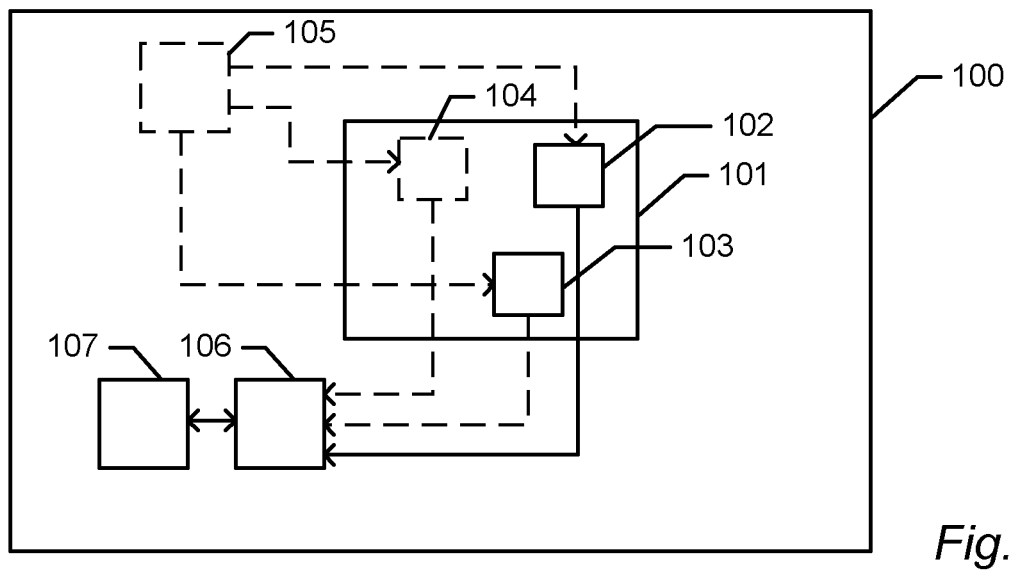
FIG. 1 shows a schematic drawing of a semiconductor radiation detector according to an embodiment of the invention.

FIG. 1 shows a schematic drawing of a semiconductor radiation detector according to an embodiment of the invention.

The radiation detector 100 comprises a converter element 101 for converting incident X-ray and gamma-ray photons into electron-hole pairs, a plurality of first cathode electrodes 102, at least one anode electrode 103, a readout circuitry 106 being configured to readout signals from the plurality of first cathodes 102, and a processing unit 107 connected to the readout circuitry 106. The converter element 101 comprises a first side and a second side, where the second side is opposite to the first side. The plurality of first cathode electrodes 102 extends along a first axis and are arranged on the first side of the converter element with a pitch (P) along a second axis, the second axis being perpendicular to the first axis. The at least one cathode 103 is arranged on the second side of the converter element 101. The processing unit 107 is configured to estimate the location of an event by firstly, determine for each of the plurality of first cathode electrodes 102, including the cathode electrode being closest to the event, the electrical potential at a first point in time (t1) and the electrical potential at a second point in time (t2) resulting in a plurality of determined potentials; and secondly estimate the location of the event in the converter element 101 along the second axis by processing the plurality of determined potentials. The radiation detector 100 may optionally further comprise a voltage source 105. The voltage source 105 may be connected to the plurality of first cathode electrodes 102 and the at least one anode electrode 103 to secure that the potential of the anodes is positive relative to the potential of the cathodes. The radiation detector 100 may optionally further comprise a plurality of drift electrodes 104 arranged on the second side of the converter element 101. The plurality of drift electrodes may be connected to voltage source 105 and the voltage source may be configured to provide the plurality of drift electrodes 105 with a potential being negative relative to the potential of the at least one anode electrode 103 whereby the electrons are steered towards the at least one anode electrode 103.

Figure 2:
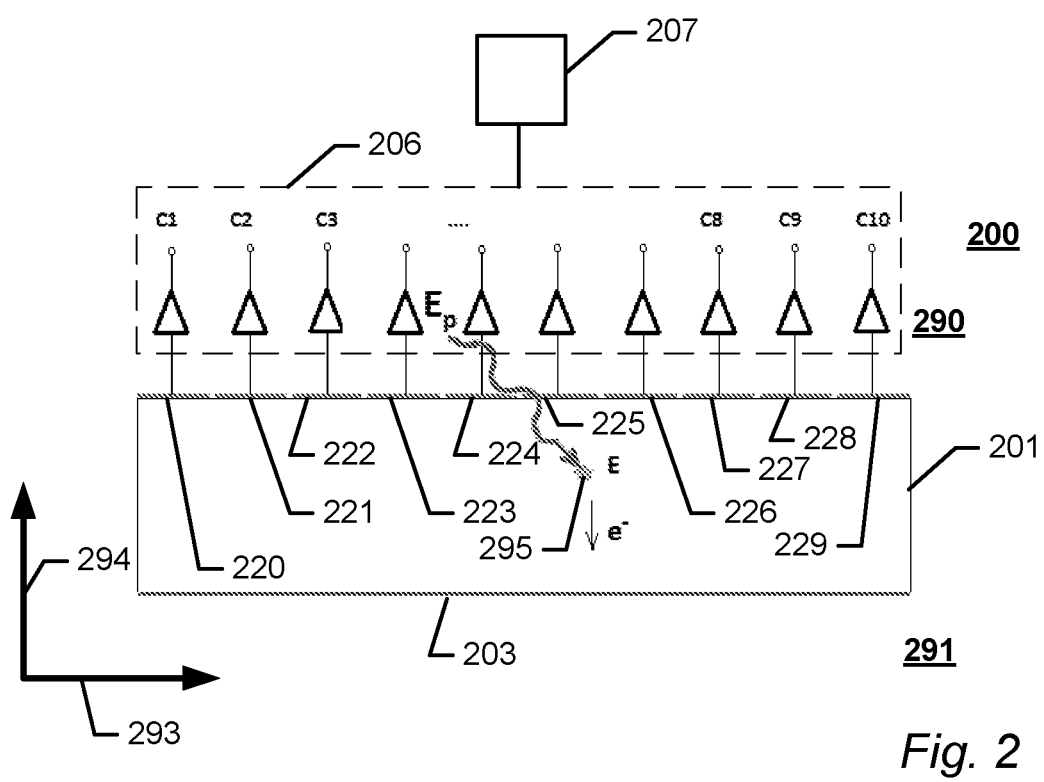
FIG. 2 shows a schematic drawing of a semiconductor radiation detector according to an embodiment of the invention.

FIG. 2 shows a schematic drawing of a semiconductor radiation detector 200 according to an embodiment of the invention. The radiation detector 200 is shown from the side. The radiation detector comprises a converter element 201 for converting incident X-ray and gamma-ray photons into electron-hole pairs having a first side 290 and a second side 291. The radiation detector comprises a plurality of first cathode electrodes 220-229 extending a long a first axis (into the paper). The plurality of first cathode electrodes are arranged with a pitch P along a second axis 293, the second axis 293 being perpendicular to the first axis. The radiation detector 200 comprises further at least one anode electrode 203 arranged on the second side 291 of the radiation detector 200. The radiation detector 200 comprises further a readout circuitry 206 (only shown schematically) configured to read out signals from the plurality of first cathode electrodes 220-229 and one processing unit 207 connected to the readout circuitry and being configured to estimate the location of an event 295 as explained above and below.

Figure 3A:
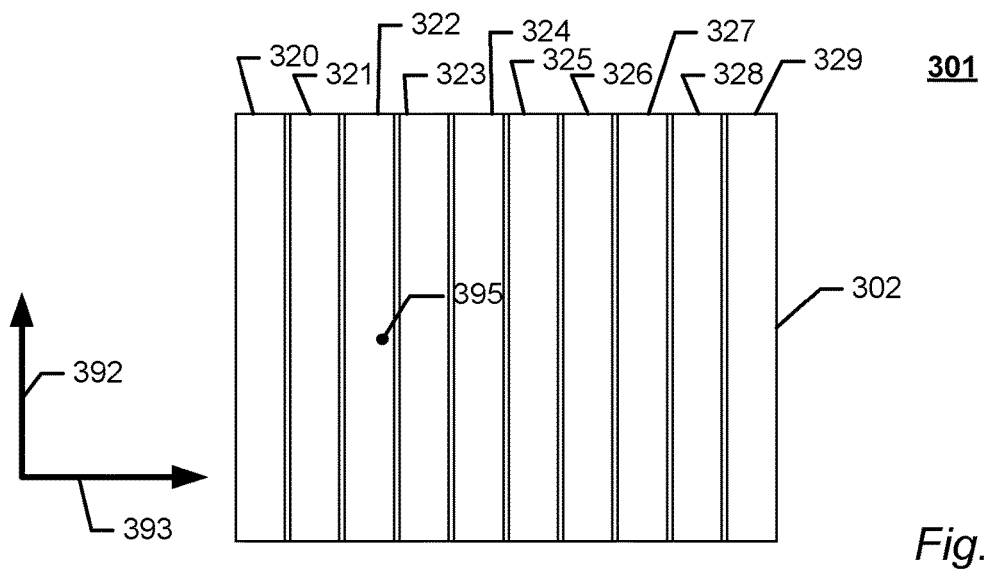
FIG. 3a, 3a shows a top view of a converter element for a semiconductor radiation detector according to an embodiment of the present invention.

FIG. 3a shows a top view of a converter element for a semiconductor radiation detector according to an embodiment of the present invention. The converter element 301 is configured to convert incident X-ray or gamma ray photons into electron-hole pairs. The converter element 301 comprises a first side and a second side opposite to the first side. The converter element 301 comprises at least one anode electrode arranged on the second side of the converter element 301 and ten cathode electrodes 320-329 arranged on the first side 302 of the converter element 301.

In this embodiment, the plurality of first cathode electrodes 320-329 are elongated parallel cathode strip electrodes extending along a first axis 392 and being arranged with a pitch P along a second axis 393, where the second axis 393 is perpendicular to the first axis 392.

Figure 3B:
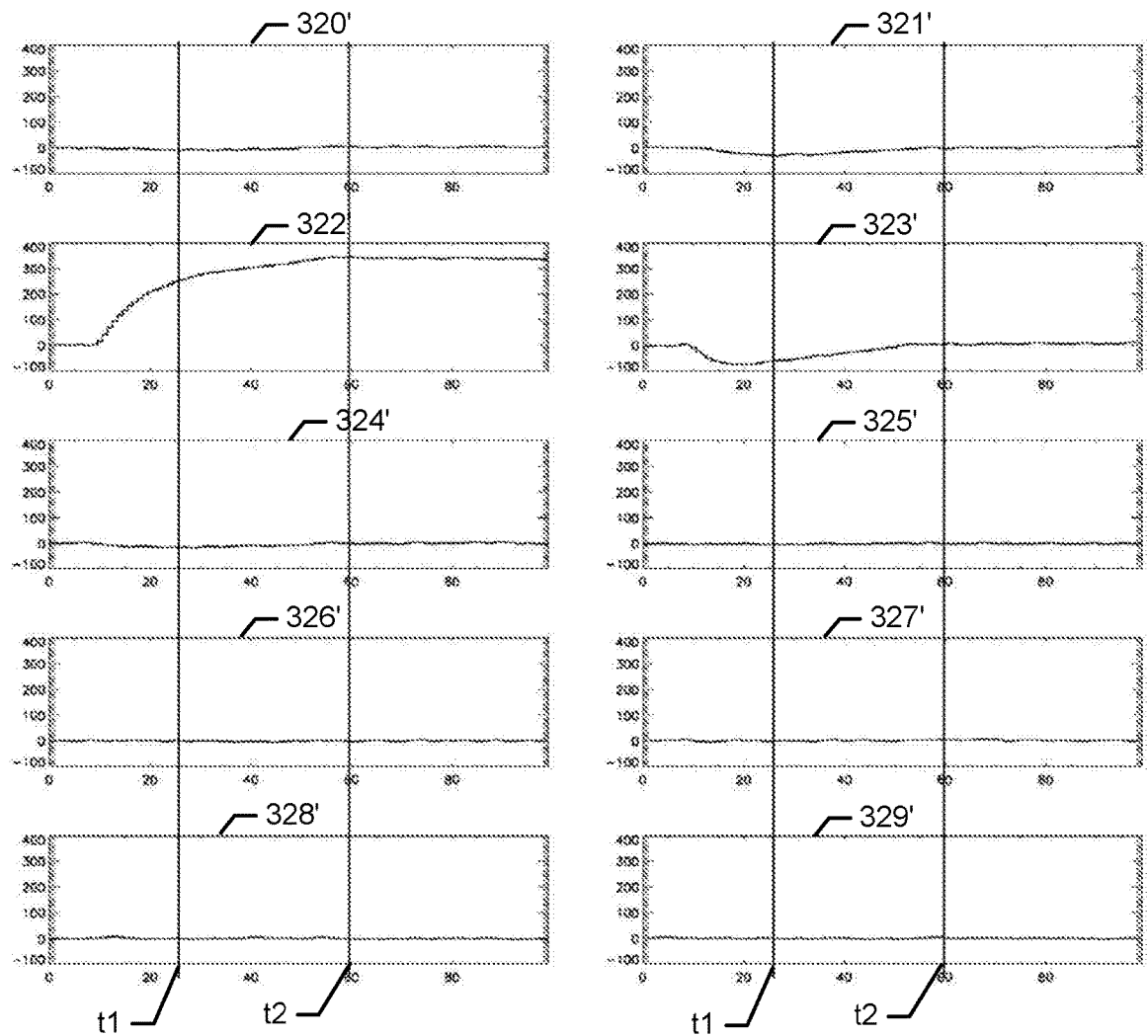
FIG. 3b show transient signals readout from cathode strip electrodes according to an embodiment of the present invention.

FIG. 3b shows the resulting transient cathode signals 320'-329' for an event 395 located close to the first side of the converter element 301. The horizontal axis in the ten plots represents time and the vertical axis represents the electrical potential. The plot 320' shows the resulting transient cathode signal for the cathode electrode 320 shown in the FIG. 3a, the plot 321' shows the resulting transient cathode signal for the cathode electrode 321 shown in the FIG. 3a, the plot 322' shows the resulting transient cathode signal for the cathode electrode 322 shown in the FIG. 3a and so forth. In this example the event is located below the cathode electrode 322 to the right of its centre. For events located close to the first side of the converter element all the positive charge will be collected by a single cathode electrode, in this example the cathode electrode 322. However, transient charges will be induces on the neighbouring cathode electrodes, in this example the cathode electrodes 321 323. Thus, be using a processing unit to determine the electrical potential of each of the cathode electrodes at least at a first point in time t1 and at a second point in time t2 (as illustrated in FIG. 3b by the two vertical lines) the transient information in the cathode signals may be utilized to more precisely estimate the location of the event 395. Furthermore, by determining electrical potentials for each of the cathode electrodes and not just the two cathode electrodes neighbouring the cathode electrode being closest to the event, a more robust radiation detector is provided e.g. the method will be able to precisely estimate the location of an even along the second axis 393 even for an event located directly between two cathode electrodes or in the presence of significant noise.

FIG. 4 shows a schematic drawing of a 3D semiconductor radiation detector according to an embodiment of the invention. FIG. 4a shows a perspective view, FIG. 4b shows a close-up of the area 487 shown in FIG. 4a, and FIG. 4c shows a close-up of the area 488 shown in FIG. 4a. The radiation detector 400 comprises a converter element 401 for converting incident X-ray and/or gamma-ray photons into electron-hole pairs (to ease the understanding, the converter element 401 is made transparent in FIG. 4a). The converter element 401 comprises a first side 408 and a second side 409 opposite to the first side 408. On the first side 408 is 10 elongated parallel cathode strip electrodes 420-429 arranged with a pitch (P), and on the second side 409 is 10 elongated parallel anode strip electrodes 460-469 with a pitch (P2) and 28 elongated parallel drift strip electrodes 431-438 (only shown in FIG. 4b) arranged. The cathode strip electrodes 420-429 each have a length (L1) and a width (W1), the anode strip electrodes 460-469 each have a length (L2) and a width (W2), and the drift strip electrodes 431-438 each have a length (L3) and a width (W3). In this embodiment L1=L2=L3, and (W2=W3)<<W1. The anode strip electrodes 460-469 and the drift strip electrodes 431-438 are both extending along a second axis 481, and the cathode strip electrodes 420-429 are extending along a first axis 480 being perpendicular to the second axis 481. The cathode strip electrodes 420-429 and the drift strip electrodes 431-438 are both connected to a voltage source 405. The voltage source 405 is configured to provide the cathode strip electrodes 431-438 with a potential being negative relative to the potential of both the drift strip electrodes 431-438 and the anode strip electrodes 460-469, whereby holes are "propagating" towards the cathode strip electrodes 420-429 and electrons are propagating toward the anode strip electrodes 460-469. The voltage source 405 is further configured to provide the drift strip electrodes 431-438 with a potential being negative relative to the potential of the anode strip electrodes 460-469, whereby the electrons are focused towards the anode strip electrodes 460-469.

The radiation detector 400 further comprises a readout circuitry 406 being configured to read out signals from the anode strip electrodes 460-469, the drift strip electrodes 431-438, and the cathode strip electrodes 420-429. The readout circuitry 406 is connected to a processing unit 407. The processing unit 407 is configured to detect an event within the convert element 401 (the interaction between a X-ray or gamma-ray photon and an electron in the converter element creating an electron/hole pair), and estimate the location of the event in three dimensions. The processing unit 407 is configured to estimate the location along the first axis 480 by processing signals obtained from both the detector strip electrodes 460-469 and the drift strip electrodes 431-438, the location along the second axis 481 by processing signals obtained from the cathode strip electrodes 420-429, and the location along a third axis 482 being perpendicular to the first axis 480 and the second axis 481 by processing signals obtained from both the detector strip electrodes 460-469 and the cathode strip electrodes 420-429.

Figure 5:
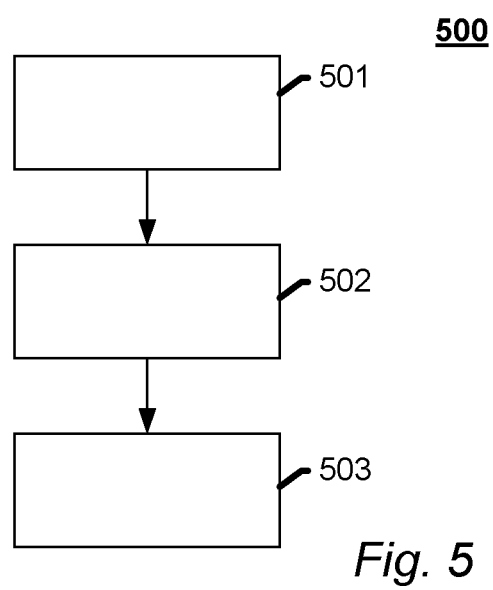
FIG. 5 shows a flow chart of a method for, along a second axis, estimating a location of an interaction between an X-ray or gamma-ray photon and a converter element according to an embodiment of the invention.

FIG. 5 shows a flow chart of a method for, along an axis, estimating a location of an interaction between an X-ray or gamma-ray photon and a converter element according to an embodiment of the invention. The converter element converting incident X-ray and gamma-ray photons into electron-hole pairs, and comprising comprising a first side and a second side, the said second side being opposite to said first side. In the first step 501, signals from a plurality of first cathode electrodes extending along a first axis and being arranged on the first side of the converter element with a pitch (P) along a second axis, the second axis being perpendicular to said first axis, is received in a processing unit. Next, in step 502, the processing unit determines for each of the plurality of first cathode electrodes, including the cathode electrode being closest to an event, the electrical potential at a first point in time (t1) and the electrical potential at a second point in time (t2) resulting in a plurality of determined potentials. Finally, in step 503 the processing unit estimates, the location of the event in the converter element along the second axis by processing the plurality of determined potentials.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A semiconductor radiation detector for detecting X-ray and/or gamma-ray radiation, the semiconductor radiation detector comprising:
   a converter element for converting incident X-ray and gamma-ray photons into electron-hole pairs, said converter element comprising a first side and a second side, said second side being opposite to said first side;
   a plurality of first cathode electrodes extending along a first axis and being arranged on said first side of said converter element with a pitch (P) along a second axis, the second axis being perpendicular to the first axis;
   at least one anode electrode arranged on said second side of said converter element;
   a readout circuitry being configured to read out signals from said plurality of first cathode electrodes;
   a processing unit connected to said readout circuitry, said processing unit being configured to estimate the location of an event in said converter element along said second axis by processing signals from said plurality of first cathode electrodes;
   wherein said processing unit is further configured to:
   determine for each of said plurality of first cathode electrodes, including the cathode electrode being closest to the event, the electrical potential at a first point in time (t1) and the electrical potential at a second point in time (t2) resulting in a plurality of determined potentials; and
   estimate the location of said event in said converter element along said second axis by processing said plurality of determined potentials.

2. The semiconductor radiation detector according to claim 1, wherein said plurality of first cathode electrodes comprises a group of cathode electrodes selected from all the cathode electrodes arranged on said first side of said converter element, and wherein said group of cathode electrodes is selected independent of the location of the event.

3. The semiconductor radiation detector according to claim 1, wherein said plurality of first cathode electrodes comprises elongated parallel cathode strip electrodes having a width (W1), and a length (L1) extending along the first axis, the pitch (P) being the pitch between two neighbouring strips.

4. The semiconductor radiation detector according to claim 1, wherein said processing unit is further configured to determine for each of said plurality of first cathode electrodes the difference between the electrical potential at the first point in time (t1) and the electrical potential at the second point in time (t2) resulting in a plurality of temporal potential differences, said processing unit further configured to estimate the position of the event along the second axis by processing the plurality of temporal potential differences.

5. The semiconductor radiation detector according to claim 4, wherein said processing unit is configured to estimate the position of said event along said second axis using the equation:

$$Pos = \left(\sum_{i=1}^{N} I_i(Q_i(t_2) - Q_i(t_1))\right) \cdot \frac{1}{\sum_{j=1}^{N}(Q_j(t_2) - Q_j(t_1))}$$

where Pos is the position along said second axis of the event, N is the total number of first cathode electrodes, $I_i$ is the position of the i'th first cathode electrode along said second axis, $Q_i(t_1)$ is the determined potential of the i'th first cathode electrode at the first point in time (t1), $Q_i(t_2)$ is the determined potential of the i'th first cathode electrode at the second point in time (t2), $Q_j(t_1)$ is the determined potential of the j'th first cathode electrode at the first point in time (t1), and $Q_j(t_2)$ is the determined potential of the j'th first cathode electrode at the second point in time (t2).

6. The semiconductor radiation detector according to claim 1, wherein said converter element comprises a room temperature converter element.

7. The semiconductor radiation detector according to claim 1, wherein a plurality of elongated parallel anode strip electrodes are arranged on said second side of said converter element with a pitch (P2), said plurality of anode strip electrodes having a width (W2), and a length (L2) and extending along the second axis;
   the pitch (P2) being the pitch between two neighbouring strips;
   the readout circuitry being further configured to read out signals from said plurality of elongated parallel anode strip electrodes; and
   the processing unit being further configured to estimate the location of the event along said first axis by processing signals obtained from said plurality of elongated parallel anode strip electrodes.

8. The semiconductor radiation detector according to claim 7, wherein said plurality of first cathode electrodes comprises elongated parallel cathode strip electrodes, and said processing unit is further configured to estimate the depth of said event, by processing one or more signals obtained from said anode strip electrodes together with one or more signals obtained from said cathode strip electrodes.

9. A method for estimating a location of an interaction between an X-ray or gamma-ray photon and a converter element, said converter element configured to convert incident X-ray and gamma-ray photons into electron-hole pairs, said converter element comprising a first side and a second side, said second side being opposite to said first side, the method comprising:
   receiving, in a processing unit, signals from a plurality of first cathode electrodes extending along a first axis and being arranged on said first side of said converter element with a pitch (P) along a second axis, the second axis being perpendicular to said first axis;
   determining, using said processing unit, for each of said plurality of first cathode electrodes, including the cathode electrode being closest to an event, the electrical potential at a first point in time (t1) and the electrical potential at a second point in time (t2) resulting in a plurality of determined potentials; and
   estimating, using said processing unit, the location of said event in said converter element along said second axis by processing said plurality of determined potentials.

10. The method according to claim 9, wherein said plurality of first cathode electrodes comprises a group of cathode electrodes selected from all the cathode electrodes arranged on said first side of said converter element, and wherein said group of cathode electrodes is selected independent of the location of the event.

11. The method according to claim 9, wherein said plurality of first cathode electrodes comprises elongated parallel cathode strip electrodes having a width (W1), and a length (L1) extending along the first axis, the pitch (P) being the pitch between two neighbouring strips.

12. The method according to claim 9, further comprising:
   determining using said processing unit, for each of said plurality of first cathode electrodes, the difference between the electrical potential at the first point in time (t1) and the electrical potential at the second point in time (t2) resulting in a plurality of temporal potential differences;
   wherein the positioning of the event along the second axis is estimated by processing the plurality of temporal potential differences.

13. The method according to claim 12, wherein said processing unit is configured to estimate the position of said event along said second axis using the equation:

$$Pos = \left(\sum_{i=1}^{N} I_i(Q_i(t_2) - Q_i(t_1))\right) \cdot \frac{1}{\sum_{j=1}^{N}(Q_j(t_2) - Q_j(t_1))}$$

where Pos is the position along said second axis of the event, N is the total number of first cathode electrodes, $I_i$ is the position of the i'th first cathode electrode along said second axis, $Q_i(t_1)$ is the determined potential of the i'th first cathode electrode at the first point in time (t1), $Q_i(t_2)$ is the determined potential of the i'th first cathode electrode at the second point in time (t2), $Q_j(t_1)$ is the determined potential of the j'th first cathode electrode at the first point in time (t1), and $Q_j(t_2)$ is the determined potential of the j'th first cathode electrode at the second point in time (t2).

14. The method according to claim 9, wherein said converter element comprises a room temperature converter element.

15. The method according to claim 9, further comprising:
   receiving, in said processing unit, signals from a plurality of elongated parallel anode strip electrodes arranged on said second said of said converter element with a pitch (P2), said plurality of anode strip electrodes having a width (W2), and a length (L2) and extending along the second axis; the pitch (P2) being the pitch between two neighbouring strips; and
   estimating, using said processing unit, the location of the event along said first axis by processing signals obtained from said plurality of elongated parallel anode strip electrodes.

16. The method according to claim 15, further comprising:
   estimating using said processing unit, the depth of said event, by processing one or more signals obtained from said anode strip electrodes together with one or more signals obtained from said cathode electrodes.

17. The method of claim 9, wherein the method is performed in:
   a medical imaging device;
   a satellite; or
   a security system for detecting and localizing radioactive material.

18. A apparatus comprising a semiconductor radiation detector, wherein the semiconductor radiation detector comprises:
   a converter element for converting incident X-ray and gamma-ray photons into electron-hole pairs, said converter element comprising a first side and a second side, said second side being opposite to said first side;
   a plurality of first cathode electrodes extending along a first axis and being arranged on said first side of said converter element with a pitch (P) along a second axis, the second axis being perpendicular to the first axis;
   at least one anode electrode arranged on said second side of said converter element;
   a readout circuitry being configured to read out signals from said plurality of first cathode electrodes;
   a processing unit connected to said readout circuitry, said processing unit being configured to estimate the location of an event in said converter element along said second axis by processing signals from said plurality of first cathode electrodes;

wherein said processing unit is further configured to:

determine for each of said plurality of first cathode electrodes, including the cathode electrode being closest to the event, the electrical potential at a first point in time (t1) and the electrical potential at a second point in time (t2) resulting in a plurality of determined potentials; and estimate the location of said event in said converter element along said second axis by processing said plurality of determined potentials.

19. The apparatus of claim 18, wherein the apparatus is a medical imaging device, a satellite, or a security system for detecting and localizing radioactive material.

20. The apparatus of claim 19, wherein the medical imaging device comprises a CT scanner, a PET scanner, a PET-CT scanner, or a SPECT scanner.

* * * * *